United States Patent
Vanzetto

(10) Patent No.: US 10,347,999 B2
(45) Date of Patent: Jul. 9, 2019

(54) ITEM FOR TIGHTENING TO THE CORRECT TORQUE, AND ELECTRICAL PROTECTION DEVICE COMPRISING AT LEAST ONE TERMINAL CONNECTED BY MEANS OF SUCH AN ITEM

(71) Applicant: Schneider Electric Industries SAS, Rueil Malmaison (FR)

(72) Inventor: Daniel Vanzetto, Claix (FR)

(73) Assignee: SCHNEIDER ELECTRIC INDUSTRIES SAS, Rueil-Malmaison (FR)

(*) Notice: Subject to any disclaimer, the term of this patent is extended or adjusted under 35 U.S.C. 154(b) by 307 days.

(21) Appl. No.: 15/426,638

(22) Filed: Feb. 7, 2017

(65) Prior Publication Data
US 2017/0288319 A1    Oct. 5, 2017

(30) Foreign Application Priority Data

Mar. 29, 2016    (FR) ..................... 16 52678

(51) Int. Cl.
*F16B 31/02* (2006.01)
*H01R 4/36* (2006.01)
(Continued)

(52) U.S. Cl.
CPC ............ *H01R 4/36* (2013.01); *B25B 15/001* (2013.01); *B25B 23/1415* (2013.01); *F16B 31/02* (2013.01); *F16B 31/021* (2013.01)

(58) Field of Classification Search
CPC ........ F16B 1/0071; F16B 31/00; F16B 31/02; F16B 31/021
(Continued)

(56) References Cited

U.S. PATENT DOCUMENTS 2,971,425 A * 2/1961 Blakeley ............... B25B 31/005
                                                       411/28
3,498,174 A * 3/1970 Hatter .................. F16B 31/021
                                                       411/5
(Continued)

FOREIGN PATENT DOCUMENTS

DE    43 09 198 A1    9/1994
EP    2 842 694 A1    3/2015
(Continued)

OTHER PUBLICATIONS

French Preliminary Search Report dated Nov. 7, 2016 in French Application 16 52678, filed Mar. 29, 2016 (with English Translation of Categories of cited documents and Written Opinion).

*Primary Examiner* — Roberta S Delisle
(74) *Attorney, Agent, or Firm* — Oblon, McClelland, Maier & Neustadt, L.L.P.

(57) ABSTRACT

An item for tightening including a first part including a first end part forming an end piece to engage with the head of a screw, and a second end part to engage with an actuating member, such that activation of the actuating member causes turning of the screw and the tightening, this first part being able to break into two portions upon reaching the recommended tightening torque, respectively a first portion including the first end part and a second portion including the second end part. A second part is mounted tightly about the first part, a holding device is provided in part on the first part and in part on the second part and being able to retain the second portion of the first part inside the second part of the item in order to prevent this second portion leaving this second part of the item after rupture of the first part.

20 Claims, 5 Drawing Sheets

Figure 4:
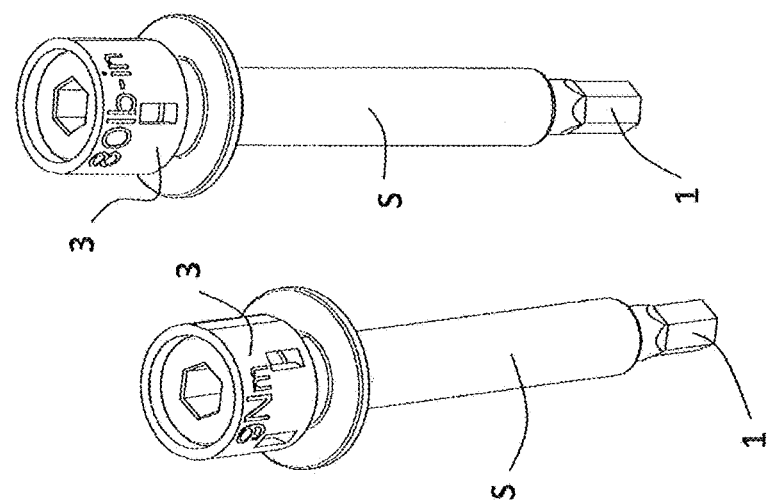

(51) Int. Cl.
 *B25B 23/14* (2006.01)
 *B25B 15/00* (2006.01)
(58) Field of Classification Search
 USPC .............................. 411/1, 2, 8, 13, 39, 916
 See application file for complete search history.

(56) References Cited

U.S. PATENT DOCUMENTS

| | | | | |
|---|---|---|---|---|
| 3,512,447 | A * | 5/1970 | Vaughn | F16B 31/021 |
| | | | | 411/5 |
| 3,561,317 | A * | 2/1971 | Rowell | F16B 31/021 |
| | | | | 411/5 |
| 3,622,946 | A * | 11/1971 | Rogers | H01R 9/16 |
| | | | | 439/475 |
| 4,502,825 | A * | 3/1985 | Yamada | F16B 31/021 |
| | | | | 411/402 |
| 5,562,484 | A * | 10/1996 | Mlynarz | H01R 4/30 |
| | | | | 411/373 |
| 5,713,705 | A * | 2/1998 | Grunbichler | F16B 31/021 |
| | | | | 411/410 |
| 8,517,649 | B2 * | 8/2013 | Pratt | F16B 13/066 |
| | | | | 411/34 |
| 9,091,291 | B2 * | 7/2015 | Andrade de Souza | |
| | | | | F16B 31/021 |
| 9,835,192 | B2 * | 12/2017 | Castonguay | H01R 4/36 |
| 2003/0198528 | A1 * | 10/2003 | Onishi | F16B 31/021 |
| | | | | 411/2 |
| 2004/0226419 | A1 | 11/2004 | Morgan | |
| 2005/0186859 | A1 | 8/2005 | Lias et al. | |
| 2007/0106283 | A1 | 5/2007 | Garcia et al. | |
| 2014/0026719 | A1 | 1/2014 | Stanfield et al. | |
| 2014/0128878 | A1 | 5/2014 | O'Neil et al. | |
| 2015/0248987 | A1 | 9/2015 | Lu et al. | |

FOREIGN PATENT DOCUMENTS

| | | |
|---|---|---|
| EP | 2 903 015 A1 | 8/2015 |
| GB | 2517910 A | 3/2015 |

\* cited by examiner

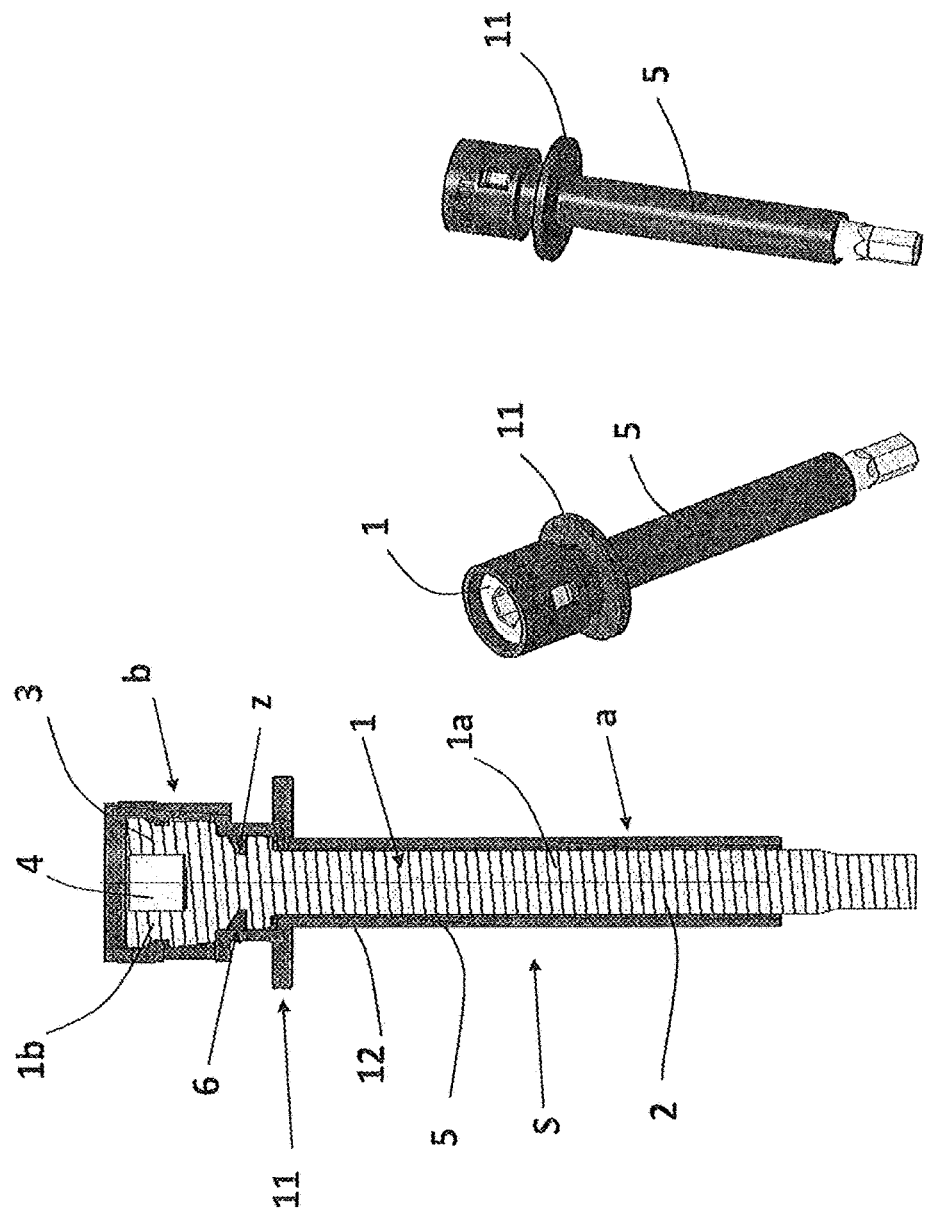

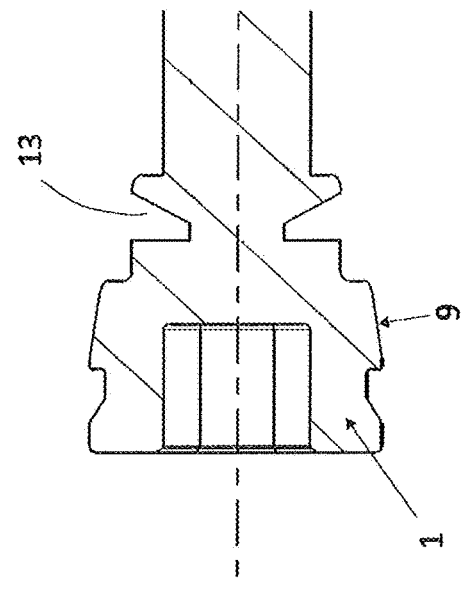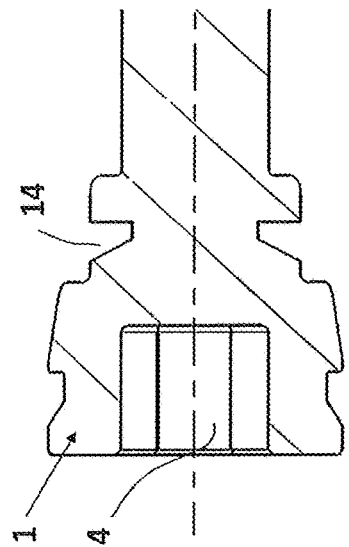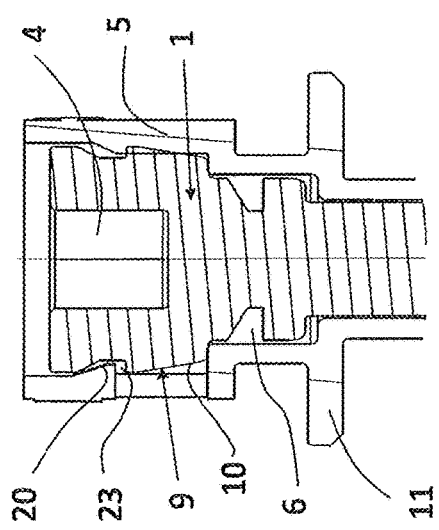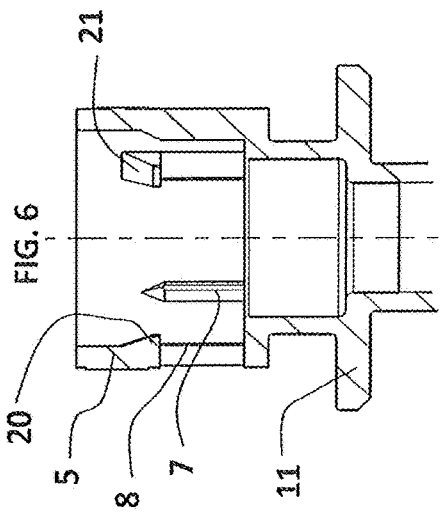

ITEM FOR TIGHTENING TO THE CORRECT TORQUE, AND ELECTRICAL PROTECTION DEVICE COMPRISING AT LEAST ONE TERMINAL CONNECTED BY MEANS OF SUCH AN ITEM

TECHNICAL FIELD

The present invention relates to an item for tightening intended to produce the tightening of two elements relative to one another by actuation of a screw, this item comprising a so-called first part, this so-called first part comprising a first end part forming an end piece able to engage with the head of the abovementioned screw, and a second end part able to engage with an actuating member, such that activation of the actuating member causes turning of the screw and the abovementioned tightening, this first part being able to break into two portions upon reaching the recommended tightening torque, respectively a first portion comprising the abovementioned first end part and a second portion comprising the abovementioned second end part.

PRIOR ART

In the field of electrical switchgear, the electrical connection of the conductors, flexible or rigid cables, to the corresponding connection areas of said switchgear, is more often than not done on site by installers.

Now, these installers on site do not have a torque wrench making it possible to produce a tightening of the conductor on the area.

In effect, these torque wrenches are costly, need to be calibrated once a year, often do not have the right range of torques corresponding to the range of switchgear involved and are likely to be the subject of theft.

In the case of the connection between the circuit breaker and the power cables of the line to be protected, the terminals of the apparatuses are sometimes tightened inaccurately, by a workforce that is increasingly less qualified.

The result thereof is retightening campaigns to ensure compliance with the torques recommended by the manufacturer.

Also known is the possibility of using hexagonal tools measuring four millimeters across the face. Now, these tools do not make it possible to guarantee the tightening torque.

Also known are breakable connecting screws used on certain ranges of switchgear, these screws incorporating their own breakable tightening device that can be broken when the tightening torque is reached. After the tightening operation, when the tightening torque is reached, the screw remains in place and the part used for the tightening is removed and discarded.

SUMMARY OF THE INVENTION

The present invention solves these problems and proposes an item for tightening to the correct torque, that is removable, that does not exhibit any risk of dropping objects in the panel, and that makes it possible to be used via a tool commonly present in any tool box of a user, such as a 4 mm hexagonal tool.

To this end, the subject of the present invention is an item of the kind mentioned previously, this item being characterized in that it comprises a second part mounted tightly about the first part, holding means provided in part on the first part and in part on the second part and being able to retain the second portion of the first part inside the second part of the item so as to prevent this second portion from leaving the second part of the item after rupture of the first part.

Thus, by virtue of these features, a work site item is obtained that is disposable and captive, making it possible to ensure the tightening to the correct torque of all the apparatuses and accessories of one and the same range, this item being able to be actuated by means of any common place tool, for example one that is hexagonal, available on site.

According to a particular feature, this item comprises so-called pre-screwing means provided partly on the first part and partly on the second part, these means being able to allow a pre-screwing of the item by a manual actuation of this second part.

According to another feature, it comprises a gripping collar protruding on the outer surface of the said second part and extending substantially at right angles to said surface, this gripping collar making it possible to both pre-screw the conductor by hand and to extract the item from the switchgear when the recommended tightening torque is reached.

According to a particular feature, this collar is made of a single piece with the second part.

According to another feature, the first part of the item is produced in a metal material.

According to another feature, the second part of the item is produced in a plastic material.

According to another feature, this second part comprises a zone on which is etched the value of the tightening torque corresponding to the rupture point of the first part and/or a colour representative of this torque is represented.

According to another feature, the value of the tightening torque corresponding to the rupture point is 9 Nm+/−0.5 or 5 Nm+/−0.5.

According to another feature, the value of the pre-tightening torque is approximately 1 Nm.

According to another feature, the abovementioned holding means comprise at least two hooks provided on the inner surface of the second part (respectively the outer surface of the first part), said hooks being capable of co-operating with voids of complementary form provided on the outer surface of the first part (respectively on the inner surface of the second part).

According to another feature, there are three of these hooks and their corresponding voids and they are equally distributed around the axis of the item.

According to another feature, these pre-screwing means comprise at least two ribs (or smooth surface portions) provided on the inner surface of the second part, these two ribs (or smooth surface portions) being intended to co-operate with two smooth surface portions (or respectively two ribs) situated facing these ribs (or smooth surface portions) and belonging to the outer surface of the first part.

According to another feature, there are three of these ribs and they are equally distributed around the axis of the item.

According to another feature, the first part comprises a zone situated between the abovementioned two end parts comprising an annular groove, this zone being able to be broken on reaching the correct tightening torque.

According to another feature, this zone is situated between the abovementioned second end part and the abovementioned collar.

According to a particular feature, the abovementioned end piece has an outer form comprising six facets capable of co-operating with a complementary hollow form provided in the head of the screw.

According to another feature, the actuating member comprises an end piece have an outer form with six facets capable of co-operating with an orifice of complementary form provided in the second end part of the first part.

Yet another subject of the present invention is an electrical protection apparatus comprising at least one point of connection of a conductor on the connection area of the apparatus, this apparatus being characterized in that this connection is made by means of an item comprising the features mentioned previously taken alone or in combination.

According to a particular feature, this conductor is a flexible cable or a rigid cable or else a terminal lug crimped onto a cable.

According to another feature, the abovementioned connection area is a connection bar.

According to another feature, the abovementioned screw is a terminal screw.

Figure 5:
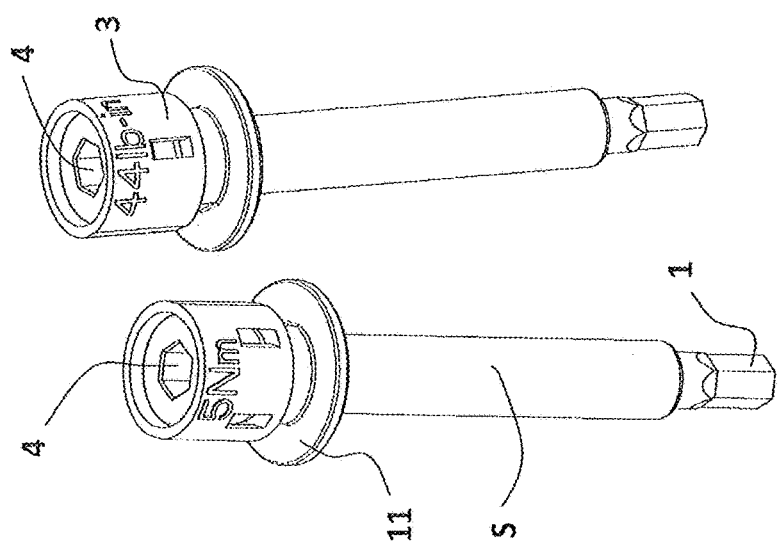

However other advantages and features of the invention will become more apparent from the following detailed description referring to the attached drawings given purely by way of example and in which:

FIG. 1 is a view in axial cross section of an item according to a particular embodiment of the invention, FIGS. 2 and 3 are two perspective views, from two different orientations, of the same item, FIGS. 4 and 5 are two views each illustrating, in perspective, two accessories according to the invention, these two figures corresponding respectively to two different tightening torques, the two accessories of each figure comprising, respectively, two different markings corresponding to two different standards.

Figure 11:
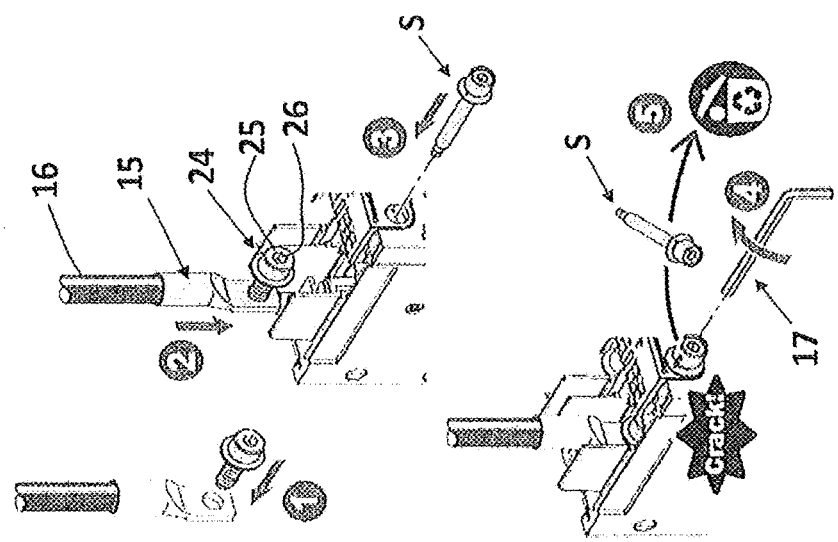
Figure 10:
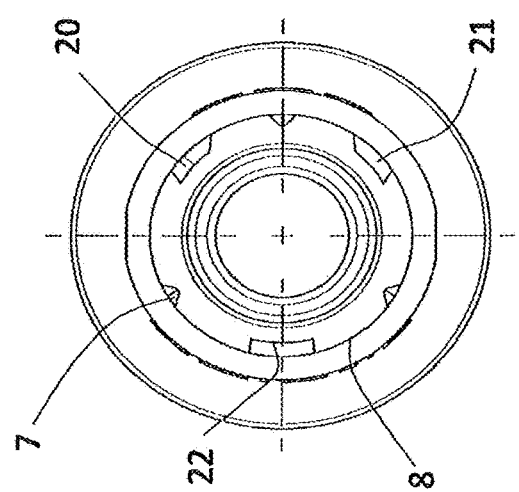
Figure 12:
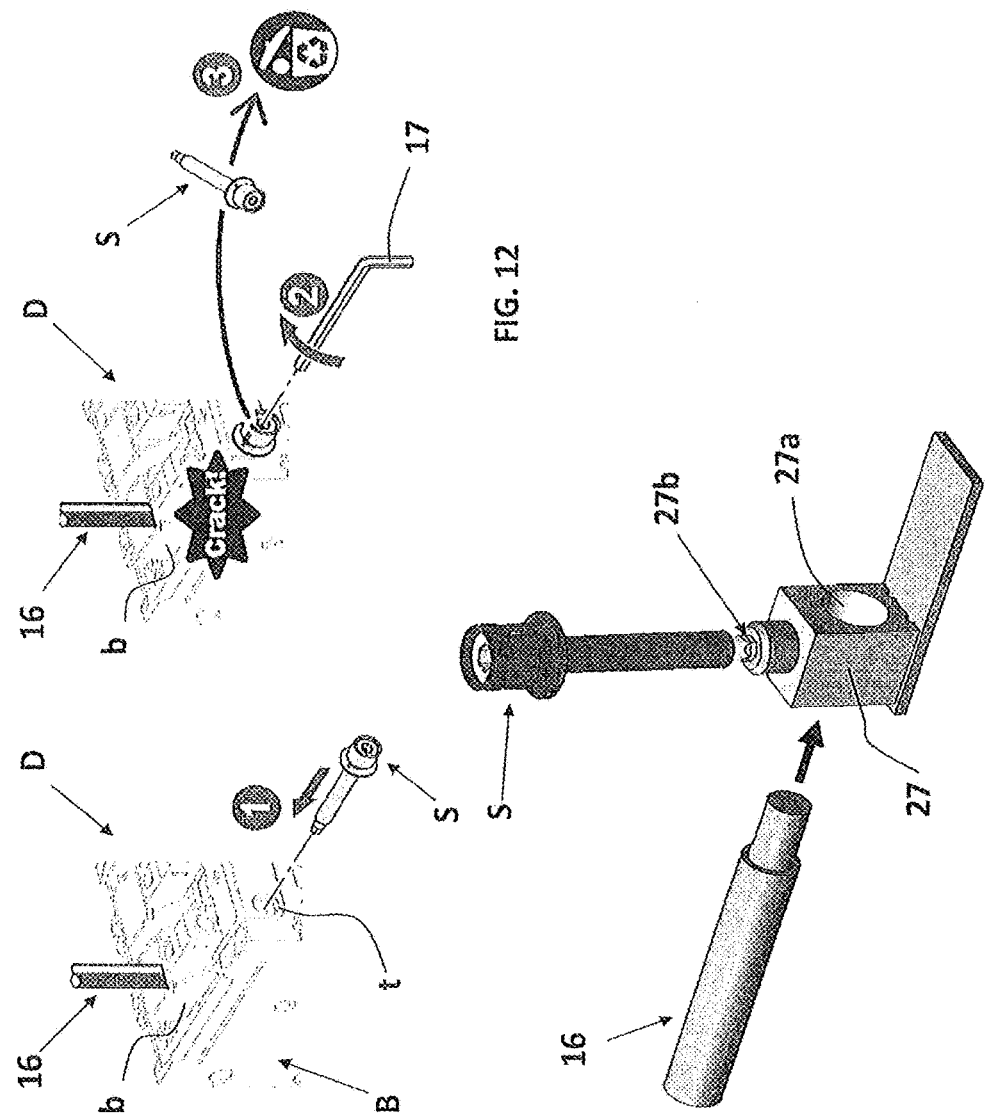

FIG. 6 is a partial view in cross section of an end part of the item,

FIG. 7 is a partial view in cross section of this same end part, without the internal part or screw of the item, FIGS. 8 and 9 respectively illustrate in a partial view in cross section, two particular embodiments of this internal part or screw, these two embodiments corresponding respectively to two different tightening torque values, FIG. 10 is a plan view of FIG. 6, FIG. 11 is a partial view in perspective, illustrating the different steps making it possible to produce the connection of a terminal lug to a connection area, by means of an item according to the invention, and FIG. 12 is a partial view in perspective, illustrating the different steps making it possible to produce the tightening of a terminal screw, by means of an item according to the invention.

In FIGS. 1 to 9, an item for tightening S according to a particular embodiment of the invention can be seen, said item being intended to be used by the user on site in order to produce the electrical connection between a conductor such as a cable 16 and the connection area of an electrical protection apparatus such as a circuit breaker D.

In FIGS. 1 to 12, this item S comprises a first part 1 comprising a first end part a, called end piece 2, intended to be introduced into a hollow part 26 of complementary form provided in the head 25 of a tightening screw 24 (FIG. 11), such as the screw 27b of a tightening terminal 27, and a second end part b, said item head 3 intended to co-operate with an actuating member such as a spanner 17 or a screwdriver. To this end, the item head 3 comprises an orifice 4 having a form complementing the outer form of the end part of the actuating member, so as to make it possible to drive the item S in rotation by the actuating member 17. Advantageously, these two forms each consist of six flat facets.

Also advantageously, the outer surface of the end piece 2 and the inner surface of the hollow part 26 of the head 25 of the tightening screw 24 also consist of six flat facets.

Thus, this item head 3 is intended to allow the grasping by a user, and the actuation by means of a tool such as a spanner 17 or a hexagonal screw driver, by this same installer, in order to drive the screw 24 in rotation in order to produce the abovementioned screwing, the tool being introduced into the abovementioned orifice 4 of corresponding form provided in the head of the item 3.

This item S also comprises a second part 5 mounted tightly around the first part 1 so as to envelop the head of the item 3 and a part of the end piece 2 except for its free end part situated on the side opposite the head of the item 3, in the manner of a sleeve.

Advantageously, this first part 1 is produced in a metallic material, whereas the second part 5 is produced in a plastic material.

The first part 1 of the item is able to break into two portions 1a, 1b, respectively first and second, upon the screwing done through the use of the actuating member 17 when the screwing travel has reached the value corresponding to the desired tightening torque.

This rupture takes place in a zone z situated between the item head 3 and the end piece 2, this zone z comprising a removal of material 6 provided for this purpose so as to weaken the end piece 2 at this point and facilitate the rupture.

As illustrated in FIGS. 8 and 9, the removal of material 6 produced under head 3 of the item will be able to be done differently depending on the tightening torque from which the item S is likely to break.

Thus, in FIG. 8, this removal of material 6 will be done in the form of a groove 13 machined on the right for a tightening torque of 5 nm, and in the form of a groove 14 exhibiting the machining done on the left for a tightening torque of 9 nm.

As more particularly illustrated in FIGS. 6 and 7, this item 5 also comprises holding means 20, 21, 23 provided partly on the first part 1 and partly on the second part 5, these means being able to retain the first portion 1a of the first part 1 inside the second part 5, after the rupture when the first portion 1a continues to turn under the action of the actuating member.

According to this particular embodiment illustrated, these holding means comprise three hooks 20, 21, 22 provided on the inner surface 8 of the second part 5, said hooks being able to co-operate with voids of corresponding form 23 provided on the outer surface 10 of the first part 1.

This item S also comprises means 7 to 10 for making it possible to perform a pre-screwing of the tightening screwing 24 before performing the actual screwing, so as to facilitate and speed up the connection procedure.

As more particularly visible in FIG. 7, these means comprise three ribs 7 provided on the inner surface 8 of the second part 5, these ribs 7 being intended to co-operate with smooth portions 9 provided facing these ribs on the outer surface 10 of the first part 1 so as to produce a pinching of this first part 1 by the second 5, this pinching being able to secure these two parts in rotation, upon the actuation of the item S in rotation manually. It will be noted that, advantageously, these ribs 7 are equally distributed around the axis X of the item S. It will be noted that the situation will be able to be reversed, in as much as the ribs 7 will be able to be provided on the first part 1 and co-operate with corresponding smooth portions 9 provided on the second part 5.

It will be noted that the value of pre-screwing torque will advantageously be 1 nm.

Advantageously, this pre-screwing will be facilitated by the presence of a collar 11 on the outer surface 12 of the second part 5 and extending substantially at right angles to this part, this grasping collar 11 making it possible to both pre-screw the conductor by hand and to extract the broken item from the switchgears.

Thus, in operation, the item S according to the invention is introduced into the orifice 26 of the tightening screw 24 via its end piece 2. Then, the conductor is pre-screwed by acting on the collar 11 by means of two hands.

Then, the tightening is done by means of a tool 17 introduced into the orifice 4 provided in the head 3 of the item S until the torque recommended by the switchgear manufacturer is reached, after which the item breaks at its breakable section of the gripping zone Z.

After which, the broken item S is removed from the apparatuses via the gripping collar 11, then discarded, the two portions 1a, 1b of the first part 1 of the item S remaining inside the second part 5 by virtue of the pressure exerted by the second part 5 of the item S on the first part.

FIG. 11 illustrates the various steps in connecting the cable 16 to the connection area of an apparatus via a crimped terminal lug 15 on the cable 16, by means of an item S according to the invention.

In -1-, the tightening screw 24 having been introduced into an orifice of the terminal lug 15, this assembly is introduced in -2-, into a recess of the housing B of the apparatus so that the terminal lug 15 is brought to bear on the connection area, after which the screw 24 is introduced into an orifice provided in the connection area, then screwed into a nut (not visible) placed behind this area.

Then, in -3-, the end piece 2 of the item S is introduced into the orifice 26 provided for this purpose in the tightening screw 24. Then, the item S is manually pre-tightened, this pre-tightening making it possible to hold the screw 24 relative to the apparatus. Then, in -4-, the item S is screwed by means of a hexagonal wrench 17 co-operating with the orifice 4 of corresponding form provided in the item S until the rupture point of the first part 1 of the item S. After which, the item consisting of the second part 5 of the item S and the two broken portions 1a, 1b of the item are removed in -5- from the housing, then discarded.

In FIG. 12, a cable 16 is connected to the connection area of an apparatus by means of a terminal screw 27b.

First of all, the cable 16 is introduced into the opening 27a of the terminal 27.

After which, in -1-, the item S is introduced into an orifice of the housing B of the apparatus, then introduced by its end piece 2 into the orifice 26 of the terminal screw 27b.

Then, the conductor is manually pre-tightened, followed by a tightening in -2-, by means of a hexagonal tool introduced into the opening provided for this purpose in the item S. Then, when the tightening torque is reached and the break has been produced, all of the item S is removed from the orifice of the housing and discarded in -3-.

Thus, after the break, the last portions 1a and 1b of the item S are held in the second part 5 of the item S by virtue of the presence of the holding means 20, 21, 22, 23.

A disposable work site item intended for installers on site has therefore been produced according to the invention, this item remaining a single piece so as to avoid metal objects being dropped in the panel.

This item allows for the tightening to the correct torque via any tool with 6 facets of 4 mm, present in the toolbox of the user.

It also makes it possible to perform a pre-tightening of the cable to be tightened, when it is fitted, to a value of approximately 1 Nm, that allowing for quick and easy work, with two hands.

This item makes it possible to equip any range of electrical switchgear with a system for tightening to the correct torque.

Obviously, the invention is not limited to the embodiments described and illustrated which have been given only by way of example.

On the contrary, the invention comprises all the technical equivalents of the means described and the combinations thereof if the latter are produced in the spirit thereof.

The invention claimed is:

1. An item for tightening two elements relative to one another by actuation of a screw, said item comprising a first part, said first part comprising a first end part forming an end piece configured to engage with the head of the screw, and a second end part configured to engage with an actuating member, such that activation of the actuating member causes turning of the screw and the tightening of the two elements, said first part being configured to break into two portions upon reaching a recommended tightening torque, respectively a first portion comprising the first end part and a second portion comprising the second end part, wherein a second part is mounted tightly about the first part, a holding mechanism is provided in part on the first part and in part on the second part and being configured to retain the second portion of the first part inside the second part of the item, in order to prevent said second portion from leaving said second part of the item after rupture of the first part, wherein the holding mechanism comprises at least two hooks provided on the inner surface of the second part, said hooks being capable of co-operating with voids of complementary form provided on the outer surface of the first part.

2. The item according to claim 1, comprising pre-screwing means provided partly on the first part and partly on the second part, said means being configured to allow a pre-screwing of the item by a manual actuation of said second part.

3. The item according to claim 2, wherein the value of the pre-tightening torque is approximately 1 Nm.

4. The item according to claim 2, wherein said pre-screwing means comprise at least two ribs or smooth surface portions provided on the inner surface of the second part, said two ribs or smooth surface portions being configured to co-operate with two smooth surface portions or respectively two ribs situated facing these ribs or smooth surface portions, and belonging to the outer surface of the first part.

5. The item according to claim 4, wherein three of the ribs are equally distributed around the axis X of the item.

6. The item according to claim 1, comprising a gripping collar protruding on the outer surface of said second part and extending substantially at right angles to said surface, said gripping collar enabling to both pre-screw the conductor by hand and to extract the item from the switchgear when the recommended tightening torque is reached.

7. The item according to claim 6, wherein the collar is made of a single piece with the second part.

8. The item according to claim 6, wherein said zone is situated between the second end part and the collar.

9. The item according to claim 1, wherein the first part of the item is formed of a metal material.

10. The item according to claim 1, wherein the second part of the item is formed of a plastic material.

11. The item according to claim 1, wherein this second part comprises a zone on which is etched the value of the tightening torque corresponding to the rupture point of the first part and/or a color representative of said torque is represented.

12. The item according to claim 1, wherein the value of the tightening torque corresponding to the rupture point is 9 Nm+/−0.5 or 5 Nm+/−0.5.

13. The item according to claim 1, wherein there are three of said hooks and the corresponding voids equally distributed around the axis X of the item.

14. The item according to claim 1, wherein the first part comprises a zone situated between the two end parts and comprising an annular groove, said zone being configured to be broken on reaching a tightening torque.

15. The item according to claim 1, wherein the end piece has an outer form comprising six facets capable of co-operating with a complementary hollow form provided in the head of the screw.

16. The item according to claim 1, wherein the actuating member comprises an end piece having an outer form with six facets capable of co-operating with an orifice of complementary form provided in the second end part of the first part.

17. An electrical protection apparatus comprising at least one point of connection of a conductor on the connection area of the apparatus, wherein the connection is made with an item according to claim 1.

18. The apparatus according to claim 17, wherein said conductor is a flexible cable or a rigid cable or else a terminal lug crimped onto a cable.

19. The apparatus according to claim 17, wherein the connection area is a connection bar.

20. The apparatus according to claim 17, wherein the screw is a terminal screw.

* * * * *